United States Patent
Farhi et al.

(10) Patent No.: US 9,960,626 B2
(45) Date of Patent: May 1, 2018

(54) APPARATUS AND METHOD FOR UPDATING REMOTE STANDALONE FIRMWARE

(71) Applicant: SYMBOL TECHNOLOGIES, LLC, Lincolnshire, IL (US)

(72) Inventors: David Farhi, Rosh-Ha'ayin (IL); Wasath Viraja Mudalige, Kadawatha (LK); Christopher R. Paul, Bayport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days. days.

(21) Appl. No.: 15/496,902

(22) Filed: Apr. 25, 2017

(65) Prior Publication Data

US 2017/0229895 A1 Aug. 10, 2017

Related U.S. Application Data

(63) Continuation of application No. 14/228,499, filed on Mar. 28, 2014, now Pat. No. 9,667,074.

(51) Int. Cl.
*H02J 7/00* (2006.01)

(52) U.S. Cl.
CPC .......... *H02J 7/0075* (2013.01); *H02J 7/0004* (2013.01); *H02J 7/007* (2013.01); *H02J 7/0011* (2013.01); *H02J 7/0027* (2013.01); *H02J 2007/0096* (2013.01)

(58) Field of Classification Search
CPC ..................................................... Y02E 60/12
USPC ......................................................... 320/107
See application file for complete search history.

(56) References Cited

U.S. PATENT DOCUMENTS

| | | | |
|---|---|---|---|
| 6,005,367 A | 12/1999 | Rohde | |
| 6,825,669 B2 | 11/2004 | Raichle et al. | |
| 8,332,836 B2 | 12/2012 | Jamerson | |
| 9,176,561 B2 * | 11/2015 | Lee | G06F 8/65 |

(Continued)

FOREIGN PATENT DOCUMENTS

| | | |
|---|---|---|
| AU | 2011323174 A1 | 5/2012 |
| EP | 1175112 A1 | 1/2002 |

(Continued)

OTHER PUBLICATIONS

International Search Report and Written Opinion from corresponding International Patent Application No. PCT/US2015/020149 dated Jun. 23, 2015.

*Primary Examiner* — Suresh Memula

(57) ABSTRACT

A charging device may include firmware configured to execute and control charging functions and updating functions performed by the charging device. The firmware includes a first section configured to store instructions associated with the charging functions and a second section configured to store instructions associated with updating the first section. The charging device may also include a charging slot for insertion of one of a rechargeable device and an updating device. The charging device may further include a micro-controller configured to execute instructions stored on the firmware. Responsive to the updating device being inserted into the charging slot, the charging device executes instructions stored in the second section to enter an updating mode and update the firmware.

5 Claims, 4 Drawing Sheets

(56) References Cited

U.S. PATENT DOCUMENTS

| | | | |
|---|---|---|---|
| 2004/0000891 A1* | 1/2004 | Raichle | G01R 31/3648 320/107 |
| 2010/0164430 A1* | 7/2010 | Lu | H01M 10/441 320/103 |
| 2010/0213891 A1 | 8/2010 | Nishikawa et al. | |
| 2012/0274266 A1 | 11/2012 | Yip | |
| 2013/0164567 A1 | 6/2013 | Olsson et al. | |
| 2014/0002009 A1 | 1/2014 | Choi | |
| 2014/0081940 A1 | 3/2014 | Everett et al. | |

FOREIGN PATENT DOCUMENTS

| | | |
|---|---|---|
| EP | 2674320 A2 | 12/2013 |
| JP | 2010044500 A | 2/2010 |
| WO | 2009/005605 A1 | 1/2009 |

* cited by examiner

APPARATUS AND METHOD FOR UPDATING REMOTE STANDALONE FIRMWARE

CROSS REFERENCE TO RELATED APPLICATION

This patent application is a continuation of U.S. patent application Ser. No. 14/228,499, filed Mar. 28, 2014, which is hereby incorporated by reference in its entirety.

BACKGROUND OF THE INVENTION

Standalone battery chargers (also referred to herein as charging devices) are widely used to charge rechargeable batteries such as those used in mobile communications devices. Non-limiting examples of mobile communication devices may include mobile or portable radios, mobile computing devices, smartphones or personal digital assistants (PDA). These standalone charging devices may be used in remote locations and may not have wired or wireless connections to other computing devices. The battery charging functions in these charging devices are typically controlled by a micro-controller based hardware circuitry with factory-installed firmware (i.e., a persistent memory that stores program code and data). Information stored in memory used by factory-installed firmware may typically be permanently installed and cannot be changed easily after manufacture. As a result, once the charging devices are deployed for use, the firmware within the charging device used to operate/control its functionality cannot be conveniently updated.

When a charging device is deployed for use in a remote location (i.e., outside of a manufacturing or service center), the firmware may need to be updated to fix errors and/or to add new features to the charging device. Typically, the charging device may have to be sent to a factory/service center or a technician may be sent to the location where the charging device is deployed to physically change or reprogram the memory associated with the firmware. Consider an example where there is a new requirement as to how data is to be secured by the firmware, a new requirement as to how the charging device is to safely operate, or a new feature to support multiple battery chemistries in a single charging device. To update the firmware used in the charging device to support the new requirements/features, a trained technician will have to visit the remote site where one or more charging devices are located and update each charging device individually or each charging device will have to be taken out of service and sent to a service center for the updates to made to the firmware. Whether or not the firmware is updated by a technician at a remote site or in a service center, the updating process involves disassembling each charging device to be updated, updating the firmware with specialized tools and reassembling the charging device. This updating process is costly and may result in a charging device being out of service for an extended time period while its firmware is being updated.

Accordingly, there is a need for an apparatus and method for updating a remote standalone firmware.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
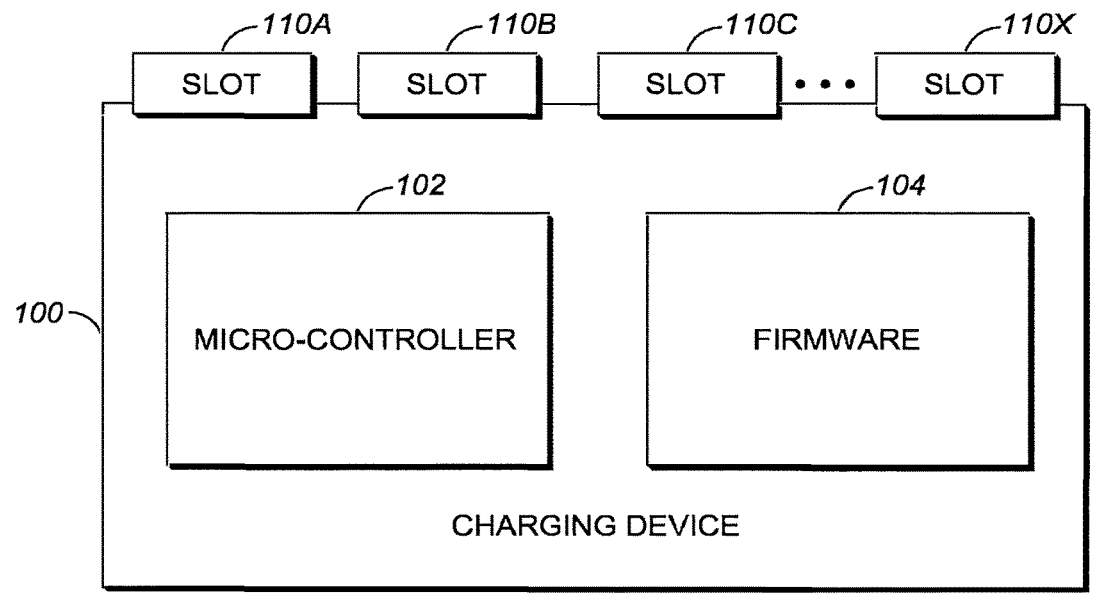
FIG. 1 is a block diagram of a charging device used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for updating firmware in a charging device. The charging device includes firmware configured to execute and control charging functions and updating functions performed by the charging device. The firmware includes a first section configured to store instructions associated with the charging functions and a second section configured to store instructions associated with updating the first section. The charging device also includes at least one charging slot for insertion of one of a rechargeable device and an updating device. The charging device further includes a micro-controller configured to execute instructions stored on the firmware. Responsive to the updating device being inserted into the charging slot, the charging device executes instructions stored in the second section to enter an updating mode and update the firmware.

FIG. 1 is a block diagram of a charging device used in accordance with some embodiments. Charging device 100 may be used to charge a rechargeable device, for example, a rechargeable battery used in a mobile communications device. Non-limiting examples of a mobile communications device may include mobile or portable radios, mobile computing devices, smartphones or personal digital assistants (PDA). Charging device may include one or more slots 110 (i.e., slots 110a-110x) for receipt of a rechargeable device. When, for example, a rechargeable battery is inserted into one of slots 110 (for example, slot 110a) in charging device 100 and contacts on the rechargeable battery are connected with contacts in slot 110a, charging device 100 may retrieve information, such as the battery characteristics or battery use data, from a memory on the rechargeable battery. Based on the information retrieved from the rechargeable device battery, charging device 100 may recharge the battery.

Charging device 100 may be a standalone device without any wired and/or wireless connections to other computing devices. Therefore, charging device 100 may be configured to include a micro-controller based hardware circuitry 102 and a factory-installed firmware 104. Micro-controller 102 may be configured to control charging and updating functions performed in charging device 100 by executing charging instructions stored in firmware 104. Firmware 104 may include a persistent memory that may be configured to store charging and updating instructions and data. Memory associated with firmware 104 may be non-volatile memory, such as read-only memory (ROM), erasable programmable read-only memory (EPROM), or flash memory (i.e., electronic non-volatile computer storage medium that can be electrically erased and reprogrammed).

Figure 2:
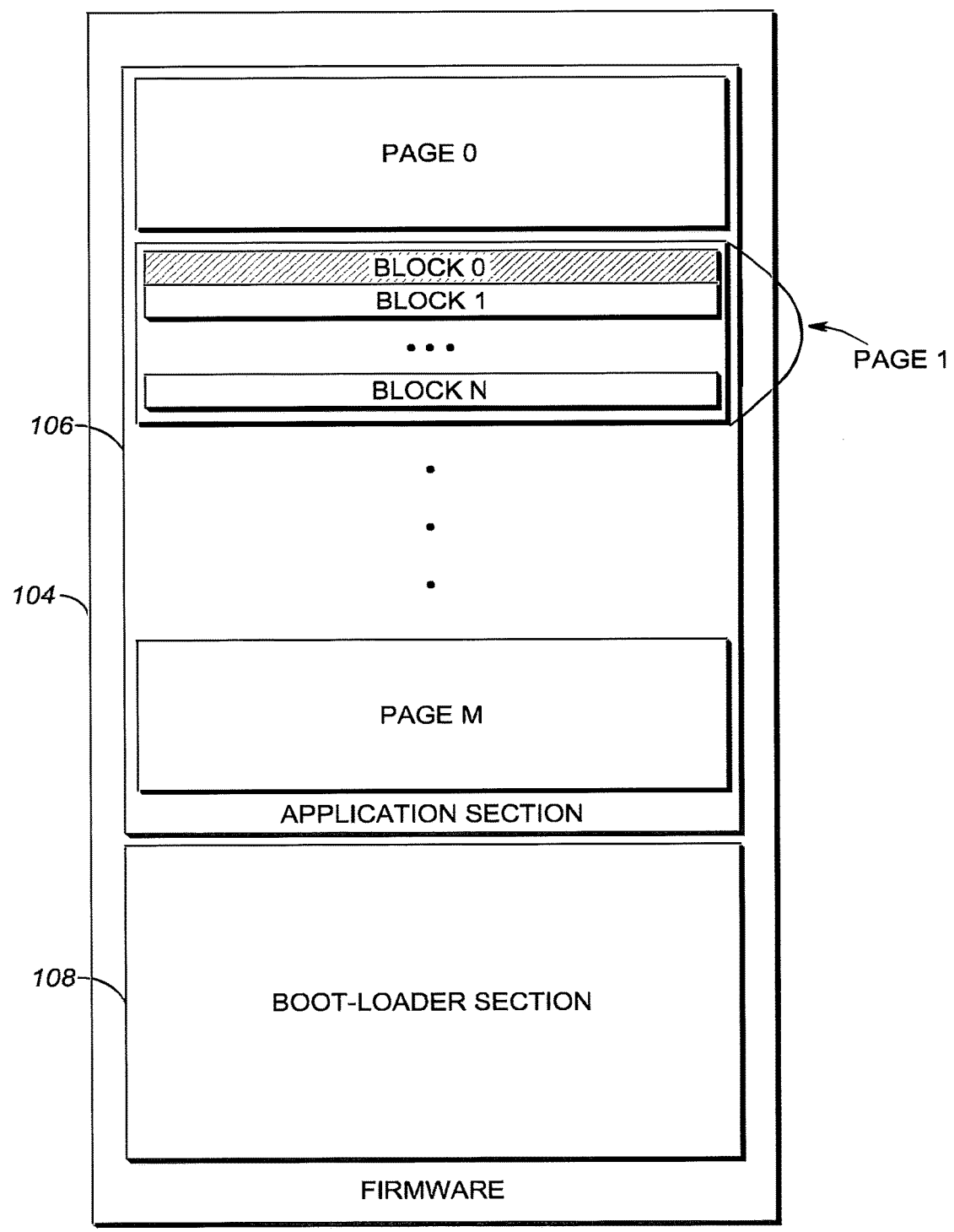
FIG. 2 is a block diagram of a firmware used in accordance with some embodiments.

FIG. 2 is a block diagram of a firmware used in accordance with some embodiments. Firmware 104 may include two separate flash memory sections, an application section 106 (also referred to herein as a first section) and bootloader section 108 (also referred to herein as a second section). Application section 106 is configured to store instructions for executing charging related functions. Accordingly, in a charging mode, firmware 104 may use instructions stored in application section 106 to charge one or more rechargeable batteries inserted into one or more charging slots 110 on charging device 100. Bootloader section 108 is configured to store bootloader instructions (i.e., instructions for loading a runtime environment for firmware 104 after completion of pre-defined start-up tests). While executing the bootloader instructions, firmware 104 may operate in an updating mode. In the updating mode, firmware 104 may update the instructions stored in application section 106.

Application section 106 may be further divided into memory sections. In an embodiment, application section 106 may be divided into pages (i.e., page 0-page M) and each page may be further divided into blocks (i.e., block 0-block N). Each block may be of a specified fixed or variable size. For example, each block may include 16 bytes of data. Portions of application section 106 may thus be uniquely identified by its page number and block number. For example, the shaded block may be identified as page 1, block 0.

Firmware 104 may be designed for a specific hardware platform. Accordingly, a platform type field may be stored in a predefined and specific block (referred to herein an identification block) in application section 106. For example, page 1 block 1, may be configured as the identification block to identify the platform on which firmware 104 is to operate. A platform type field stored in page 1, block 1, may include a unique platform type value that identifies the associated hardware platform on which firmware 104 may operate. In some embodiments, a platform type field may be unnecessary because each category of mobile communications devices may have physically distinguishable batteries which cannot be mechanically inserted within the battery slots of other categories of mobile communications devices. Hence, the physical form of the battery itself may be a platform identifier.

Firmware 104 may also be assigned one or more version numbers. For example, firmware 104 may be assigned a major version number and/or a minor version number to identify the version(s) of the instructions stored in application section 106. The version numbers may also be stored in a predefined and specific block in application section 106. A checksum value may also be stored in a predefined and specific block in application section 106. The checksum value is calculated during compilation of the instructions to be stored in application section 106. The checksum value may be checked before instructions stored in application section 106 is updated and may be used to verify the integrity of firmware 104 after firmware 104 has been updated. The platform type value, versions numbers and/or checksum value may each be stored in the same identification block or in a different identification blocks.

Figure 3:
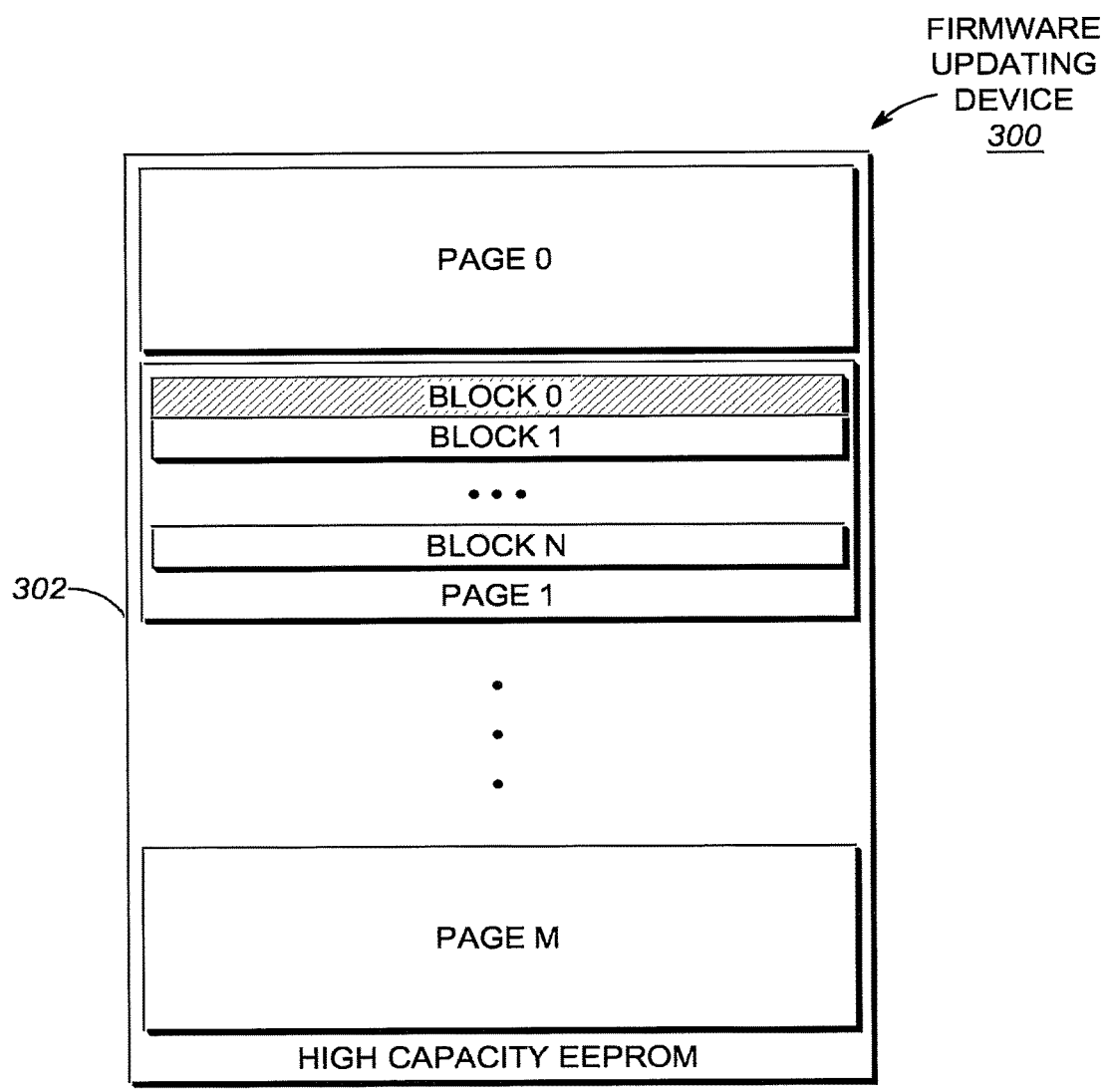
FIG. 3 is a block diagram of a firmware updating device used in accordance with some embodiments.

Charging device 100 may include one or more charging slots 110 (i.e., slots 110a-110x) for inserting, for example, a rechargeable battery. A firmware updating device, as shown in FIG. 3, may also be inserted into one or more predefined charging slots 110 (also referred to herein as a charging and updating slot) in order to update firmware 104. In addition, a rechargeable battery may also be recharged when inserted in the charging and updating slot(s).

FIG. 3 is a block diagram of a firmware updating device formed in accordance with some embodiments. The external form of firmware updating device 300 may be the same as the external form of, for example, a rechargeable battery configured to be charged when inserted into a charging slot 110 in charging device 100. However, unlike a rechargeable battery which may include some combination of a thermistor, cells, cell protection devices, integrated circuits for assessing battery parameters, low capacity EEPROM, and a slave address associated with the memory of the rechargeable battery and that is dependent on a hardware platform, firmware updating device 300 may not include cells and therefore may not have to go through a safety approval process and has no shelf life limitation. Firmware updating device 300 includes a high capacity (HC) electrically erasable programmable read-only memory (EEPROM) 302 whose slave address is distinguishable from that of a rechargeable battery. Charging device 100 may therefore use the distinguishable slave address to identify firmware updating device 300 and to distinguish firmware updating device 300 from a standard rechargeable battery. The capacity of the HC EEPROM 302 may be the same as or larger than that of application section 106 in the firmware 104 to be updated. The internal circuitry of firmware updating device 300 may be designed so that firmware updating device 300 can be used on different charging device platforms, without requiring hardware modification.

Before firmware 104 may be updated, instructions to be stored in application section 104 of firmware 104 may be stored in HC EEPROM 302 on firmware updating device 300. The instructions may be downloaded to firmware updating device 300 from a computer to which firmware updating device 300 is connected. Even though charging device 100 may include multiple charging slots 110, firmware 104 may only be updated with the instructions stored in HC EEPROM 302 on firmware updating device 300 when firmware updating device 300 is inserted into an updating and charging slot. When charging device 100 includes a single charging slot, the single slot is configured as both the updating and charging slot. Each updating and charging slot, on a charging device with one or more slots 110, is also configured to receive both a rechargeable battery that is to be charged by charging device 100 and firmware updating device 300.

As noted previously, one or more slots 110 may be predefined as the updating and charging slots and firmware 104 may only be updated with the instructions stored in HC EEPROM 302 when firmware updating device 300 is inserted into a predefined updating and charging slot, for example, slot 110a. In an embodiment, where only one slot (for example, slot 110a) is predefined as an updating and charging slot, possible confusion that may occur when two different firmware updating devices 300 are simultaneously inserted in two charging slots 110 on charging device 100 may be eliminated. In an embodiment where two or more slots 110 are predefined as the updating and charging slots, a mechanism in firmware 104 may be used to determine which inserted firmware updating device 300 should be used to update firmware 104. For example, the mechanism in firmware 104 may use a priority associated with each of the predefined updating and charging slots or a priority associated with each inserted firmware updating device 300 to identify a firmware updating device 300 that is to be used to update firmware 104.

When a device, for example, a rechargeable battery or firmware updating device 300, is inserted into any charging slot 110, including any predefined updating and charging slot(s), charging device 100 reads the battery data from the EEPROM on the device. Responsive to charging device 100 successfully reading the battery data from the inserted device, micro-controller 102 on charging device 100 performs the battery charging functions by executing instructions stored in application section 106 of firmware 104. If charging device 100 cannot successfully read the battery data from the EEPROM on the inserted device, it determines whether the device is inserted into any of the predefined updating and charging slots, for example, updating and charging slot 110a. If the slot in which the device is inserted is determined to be an updating and charging slot, charging device 100 may determine that the inserted device is firmware updating device 300 by successfully reading a charging device type and/or firmware versions from the identification block(s) in HC EEPROM 302 of the inserted device. In an embodiment, charging device 100 may identify or validate the charging device platform type associated with firmware updating device 300 when firmware updating device 300 is inserted into the updating and charging slot and an appropriate electrical connection is formed between the updating and charging slot and the firmware updating device 300. Responsive to successfully reading/validating the charging device type and/or firmware versions stored in HC EEPROM 302 of the inserted device, and validating the integrity of the data stored on the inserted device through the use of the checksum, charging device 100 may begin a firmware updating process.

Subsequent to beginning the firmware updating process, charging device 100 may determine the charging device type and/or firmware versions for the instructions stored in HC EEPROM 302. If the charging device type is received from HC EEPROM 302 or determined based on the physical form of firmware updating device 300, charging device 100 compares the determined charging device type with a charging device type stored in firmware 104, and if the types match, charging device 110 compares the firmware versions retrieved from HC EEPROM 302 with the versions stored in firmware 104. If the firmware versions retrieved from HC EEPROM 302 is a later version than the version stored in firmware 104, charging device 100 enters a bootloader mode (also referred to as the updating mode) and updates firmware 104 by executing bootloader instructions stored in bootloader section 108. Accordingly, firmware 104 may only be updated if the firmware versions stored on firmware updating device 300 is newer than the existing firmware versions stored on charging device 100.

Responsive to entering the bootloader mode, information stored in application section 106 is erased. Data may be read from the HC EEPROM 302, one page at a time, and written into application section 106. When all pages of application section 106 have been updated, the bootloader verifies the checksum of the new firmware, exits from the bootloader mode, and provides an indication to a user that the upload was successful. The indication may be provided, for example, via a status light-emitting diode (LED) on charging device 100. Similarly, if the checksum cannot be verified, for example, because the new firmware is corrupted or invalid, a notification may be provided to the user via the status LED. Each of a successful and unsuccessful status may be associated with a predefined blinking pattern.

If the firmware update process is disturbed by, for example, removal of firmware updating device 300 while the firmware update process is in progress, charging device 100 may recover the firmware update process when firmware updating device 300 is reinserted into the updating and charging slot. In this case, there may be no firmware version comparison(s), but the charging device type comparison may be used to ensure that the correct firmware is programmed on firmware updating device 300. In the case where the charging device type is corrupted and/or unavailable during a firmware update recovery process, the firmware update recovery process may still proceed when firmware updating device 300 with the correct form factor is properly inserted to the updating and charging slot (i.e., there is an appropriate electrical connection between firmware updating device 300 and the updating and charging slot).

The overall firmware update process may occur over a relatively short time period, for example, less than one minute. Various states of the firmware update process, for example, when the firmware update in progress or completed, may be shown using unique LED blinking patterns on a status LED. Manufacturing of firmware updating device 300 therefore adds no additional costs to the manufacturing of the charging device 100. In some embodiments, for easy identification, firmware updating device 300 may be designed with colors that are different from the colors used on standard rechargeable batteries and firmware updating device 300 may be clearly labeled with the firmware version stored on firmware updating device 300. Firmware updating device 300 may also be clearly labeled with the charging device type that firmware updating device 300 is configured to charge. Accordingly, one or more firmware updating devices 300 may be sufficient to upgrade an installation base with multiple charging devices. In addition, a single firmware updating device 300 may be shipped between multiple locations, a much easier and cost effective solution than shipping a charging device to a service center to update the firmware on the charging device or sending a specialized technician to a remote location to update the firmware on a charging device.

In an embodiment, firmware updates may be uploaded to a support center that can be accessed via a computer network. A terminal configured with necessary tools (not shown) and connected to the computer network may download the firmware updates and program firmware updating device 300 with newly downloaded firmware updates. This eliminates the need for recalling firmware updating device 300 when new firmware updates becomes available.

The newly downloaded firmware updates may be encrypted in firmware updating device 300 and may be decrypted by the bootloader before the code is used to update firmware 104. After the bootloader instructions are programmed and stored in bootloader section 108, the bootloader instructions may be rendered unreadable. The bootloader instructions may also be unmodifiable. The bootloader instructions may include the key(s) for encryption and decryption schemes (i.e., unreadable encryption/decryption keys) so that information provided on firmware updating device 300 can be properly encrypted/decrypted and retrieved by the bootloader.

Figure 4:
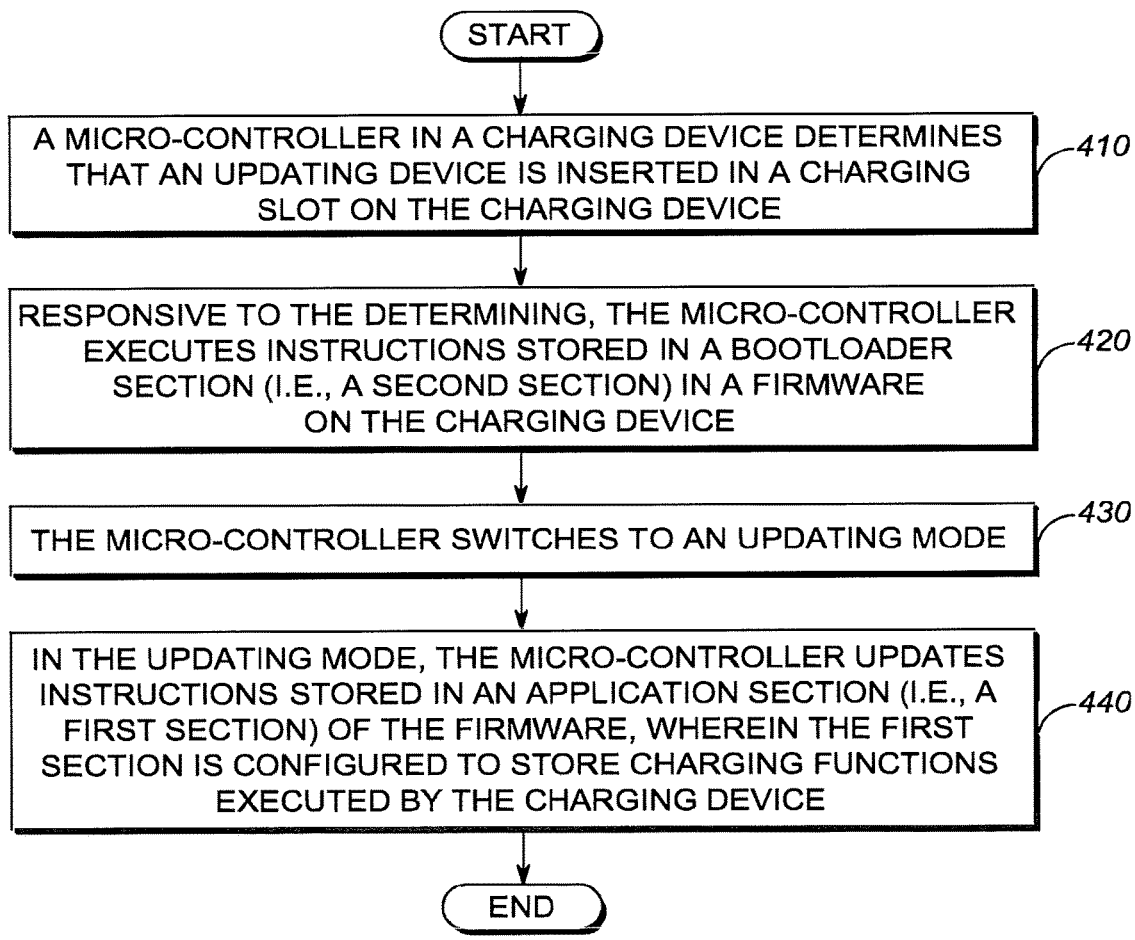
FIG. 4 is a flowchart of a method of updating a charging device in accordance with some embodiments.

FIG. 4 is a flow diagram of a method of updating a charging device in accordance with some embodiments. At

410, a micro-controller in a charging device determines that an updating device is inserted in a charging slot on the charging device. At 420, responsive to the determining, the micro-controller executes instructions stored in a bootloader section (i.e., a second section) in a firmware on the charging device. At 430, the micro-controller switches to an updating mode. At 440, in the updating mode, the micro-controller updates instructions stored in an application section (i.e., a first section) of the firmware, wherein the first section is configured to store charging functions executed by the charging device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method, comprising:
  determining, by a micro-controller, that an updating device is inserted in at least one charging slot on a charging device;
  responsive to the determining, by the micro-controller, executing instructions stored in a second section in a firmware of the charging device;
  switching, by the micro-controller, to an updating mode; and
  updating instructions stored in a first section of the firmware, wherein the first section is configured to store charging instructions executed by the charging device, the updating comprising:
    verifying the integrity of information stored on the updating device,
    erasing information stored in the first section,
    retrieving information from the updating device,
    writing the information retrieved from the updating device to the first section, and
    verifying the integrity of the information written to the first section.
2. The method of claim 1, further comprising:
  determining, by the micro-controller, that a rechargeable device is inserted into the at least one charging slot;

using, by the micro-controller, instructions stored in the first section to enter a charging mode and to charge the rechargeable device.

3. The method of claim 1, further comprising:
determining, by the micro-controller, that one of a rechargeable device and the updating device is inserted in one of a plurality of slots in the charging device, wherein the at least one charging slot is one of a plurality of slots in the charging device;
attempting, by the micro-controller, to retrieve data associated with the rechargeable device to execute instructions stored in the first section, and
wherein if the data associated with rechargeable device cannot be read, determining, by the micro-controller, that the updating device is inserted in the at least one charging slot.

4. A method, comprising:
determining, by a micro-controller, that an updating device is inserted in at least one charging slot on a charging device;
responsive to the determining, by the micro-controller, executing instructions stored in a second section in a firmware of the charging device;
switching, by the micro-controller, to an updating mode; and
updating instructions stored in a first section of the firmware, wherein the first section is configured to store charging instructions executed by the charging device, the updating comprising:
retrieving, by the micro-controller, at least one of a charging device type and a firmware version from a non-volatile memory of the updating device,
comparing, by the micro-controller, the charging device type with information stored in the first section, and if there is a match, comparing the firmware version with information stored in the first section,
if the firmware version is later than a version retrieved from the first section, retrieving, by the micro-controller, information from the updating device and updating the first section with information retrieved from the updating device.

5. A method, comprising:
determining, by a micro-controller, that an updating device is inserted in at least one charging slot on a charging device;
responsive to the determining, by the micro-controller, executing instructions stored in a second section in a firmware of the charging device;
switching, by the micro-controller, to an updating mode; and
updating instructions stored in a first section of the firmware, wherein the first section is configured to store charging instructions executed by the charging device, the updating comprising:
retrieving, by the micro-controller, a firmware version from a non-volatile memory of the updating device,
comparing, by the micro-controller, the firmware version with information stored in the first section,
if the firmware version is later than a version retrieved from the first section, retrieving, by the micro-controller, information from the updating device and updating the first section with information retrieved from the updating device.

* * * * *